United States Patent
Cox et al.

(10) Patent No.: US 12,489,489 B2
(45) Date of Patent: Dec. 2, 2025

(54) DETECTION AND ACQUISITION OF SIGNALS OVER LARGE DOPPLER FREQUENCY RANGES

(71) Applicant: BAE SYSTEMS Information and Electronic Systems Integration Inc., Nashua, NH (US)

(72) Inventors: Steven W. Cox, Bedford, NH (US); Sara L. MacDonald, Carlisle, MA (US); Alyssa N. Partridge, Goffstown, NH (US); Michael J. Vinskus, Londonderry, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1 day.

(21) Appl. No.: 18/671,430

(22) Filed: May 22, 2024

(65) Prior Publication Data

US 2025/0365032 A1    Nov. 27, 2025

(51) Int. Cl.
*H04B 1/7163*    (2011.01)

(52) U.S. Cl.
CPC ..... *H04B 1/71637* (2013.01); *H04B 1/71632* (2013.01)

(58) Field of Classification Search
CPC .......... H04B 1/71637; H04B 1/71632
See application file for complete search history.

(56) References Cited

U.S. PATENT DOCUMENTS

| 5,999,561 A | 12/1999 | Naden et al. |
| 6,005,889 A | 12/1999 | Chung et al. |
| 6,028,883 A * | 2/2000 | Tiemann ............... H04B 1/707 370/335 |

(Continued)

FOREIGN PATENT DOCUMENTS

| AU | 1997037394 A1 | 7/1997 |
| EP | 0 892 528 A2 | 1/1999 |

(Continued)

OTHER PUBLICATIONS

International Search Report, PCT/US2025/030332, mailed Jul. 21, 2025, 14 pages.

*Primary Examiner* — Freshteh N Aghdam
(74) *Attorney, Agent, or Firm* — Scott J. Asmus (57) ABSTRACT

Techniques are provided for detection and acquisition of signals. A methodology implementing the techniques according to an embodiment includes correlating an input signal with a code sequence at a first plurality of frequency offsets and generating a first bit vector representing locations of correlation detection peaks for each of the first plurality of frequency offsets; correlating the input signal with the code sequence at a second plurality of frequency offsets and generating a second bit vector representing locations of correlation detection peaks for each of the second plurality of frequency offsets; and generating a combined bit vector and accumulating the combined bit vectors over time. The method also includes identifying two consecutive correlation detection peaks in the accumulated combined bit vectors that are separated by a number of bit locations that (Continued)

correspond to a selected range of Doppler offsets; and generating a signal acquisition detection in response to the identification.

20 Claims, 6 Drawing Sheets

(56) References Cited

U.S. PATENT DOCUMENTS

| | | | |
|---|---|---|---|
| 6,041,280 A * | 3/2000 | Kohli | G01S 19/30 342/357.33 |
| 6,898,176 B1 | 5/2005 | Cruickshank et al. | |
| 6,967,993 B1 | 11/2005 | Miller | |
| 7,042,930 B2 | 5/2006 | Dafesh | |
| 7,224,721 B2 | 5/2007 | Betz et al. | |
| 7,447,259 B2 | 11/2008 | Betz et al. | |
| 7,522,100 B2 | 4/2009 | Yang et al. | |
| 7,613,231 B2 | 11/2009 | Cho | |
| 7,639,181 B2 | 12/2009 | Wang et al. | |
| 8,331,422 B2 | 12/2012 | Weill | |
| 8,391,341 B2 | 3/2013 | Weill | |
| 8,401,546 B2 | 3/2013 | Landry et al. | |
| 8,542,718 B2 | 9/2013 | Weill | |
| 8,615,032 B2 | 12/2013 | Weill | |
| 8,630,332 B2 | 1/2014 | Young | |
| 9,319,097 B2 | 4/2016 | Chae et al. | |
| 9,356,648 B1 | 5/2016 | Wu et al. | |
| 10,281,584 B2 | 5/2019 | Turner et al. | |
| 2004/0071200 A1 | 4/2004 | Betz et al. | |
| 2007/0076786 A1 * | 4/2007 | Shanmugam | G01S 19/30 375/150 |
| 2007/0195867 A1 * | 8/2007 | Betz | G01S 19/30 375/E1.008 |
| 2007/0253471 A1 | 11/2007 | Wilhelmsson et al. | |
| 2009/0268788 A1 | 10/2009 | Simic et al. | |
| 2011/0310935 A1 | 12/2011 | Hadef | |
| 2012/0319899 A1 * | 12/2012 | Tangudu | G01S 19/246 342/357.69 |
| 2017/0237591 A1 | 8/2017 | Atungsiri et al. | |
| 2022/0276389 A1 | 9/2022 | Yu et al. | |

FOREIGN PATENT DOCUMENTS

| | | |
|---|---|---|
| IN | 227629 B | 1/2009 |
| WO | 98/02975 A1 | 1/1998 |
| WO | 01/45288 A1 | 6/2001 |
| WO | 2004/034604 A1 | 4/2004 |

* cited by examiner

DETECTION AND ACQUISITION OF SIGNALS OVER LARGE DOPPLER FREQUENCY RANGES

STATEMENT OF GOVERNMENT INTEREST

This invention was made with United States Government assistance under Contract No. HR001121C0002, Defense Advanced Research Projects Agency. The United States Government has certain rights in this invention.

FIELD OF DISCLOSURE

The present disclosure relates to signal detection and acquisition, and more particularly to detection and acquisition of spread spectrum signals over large Doppler frequency ranges.

BACKGROUND

Spread spectrum signals typically include a header code sequence or preamble that allows for detection and synchronization of the signal. When either the transmitter of the signal or the receiver (or both) are in motion, the spread spectrum signal is subject to Doppler shifts which make detection of the preamble more challenging.

Although the following Detailed Description will proceed with reference being made to illustrative embodiments, many alternatives, modifications, and variations thereof will be apparent in light of this disclosure.

DETAILED DESCRIPTION

Techniques are provided herein for an acquisition system to provide detection and acquisition of signals over large Doppler frequency ranges, including Doppler induced signal frequency offsets and Doppler induced sampling frequency offsets. In some embodiments, the signals may include spread spectrum signals (e.g., GPS codes or other navigation signals, or communication signals) and the disclosed techniques may be used to detect, acquire, and synchronize to a preamble of the signal.

As noted above, when either the signal transmitter, or the receiver, or both, are in motion, the spread spectrum signal is subject to Doppler shifts which make detection of the preamble more difficult. To this end, and in accordance with an embodiment of the present disclosure, an architecture is disclosed for spread spectrum signal detection and acquisition that employs frequency domain matched filtering across a range of Doppler frequencies to perform a correlation based search for the preamble. The correlation is performed as a linear convolution using an "overlap and save" method, as will be described in greater detail. Linear Convolution, as opposed to a circular convolution, allows for continuous detection of preamble segments since the input is not assumed to be periodic. This technique enables detection of preamble patterns such that the matched filter response includes the full length of the preamble of interest, avoiding partial correlations and increasing the processing gain of the detection.

The detected preamble may then be used to provide time synchronization for subsequent demodulation of the signal. In some applications, for example, where relative motion or speed between receiver and transmitter is unknown, the disclosed techniques, for detection of the signal containing unknown Doppler frequency offset, can be used to align time synchronization codes. This would otherwise not be possible using geolocation information of the receiver alone, and geolocation using ephemeris data from the transmitter would involve complex calculations, tracking, and a-priori communication of the ephemeris data.

In some embodiments, resource managed processing banks operating in a time multiplexed fashion are used to reduce latency and efficiently utilize hardware resources, for example in a field programmable gate array (FPGA) or other suitable logic. The techniques are readily scalable, to handle a wide range of Doppler shifts, by duplicating the time multiplexed processing banks for parallel operation.

In accordance with an embodiment, a methodology implementing the techniques for detection and acquisition of signals over large Doppler offsets includes correlating an input signal with a code sequence at a first plurality of frequency offsets and generating a first bit vector representing locations of correlation detection peaks for each of the first plurality of frequency offsets. The method further includes correlating the input signal with the code sequence at a second plurality of frequency offsets and generating a second bit vector representing locations of correlation detection peaks for each of the second plurality of frequency offsets. The method further includes generating a combined bit vector and accumulating the combined bit vectors over time. The method further includes identifying two consecutive correlation detection peaks in the accumulated combined bit vectors that are separated by a number of bit locations that correspond to a signal repetition rate modified by a selected range of Doppler offsets and generating a signal acquisition detection in response to the identification, as will be explained in greater detail below.

It will be appreciated that the techniques described herein may provide improved acquisition of spread spectrum signals across relatively large Doppler offsets, compared to other methods that require more complex and costly processing resources or that suffer from greater detection latency. Numerous embodiments and applications will be apparent in light of this disclosure.

System Architecture

Figure 1:
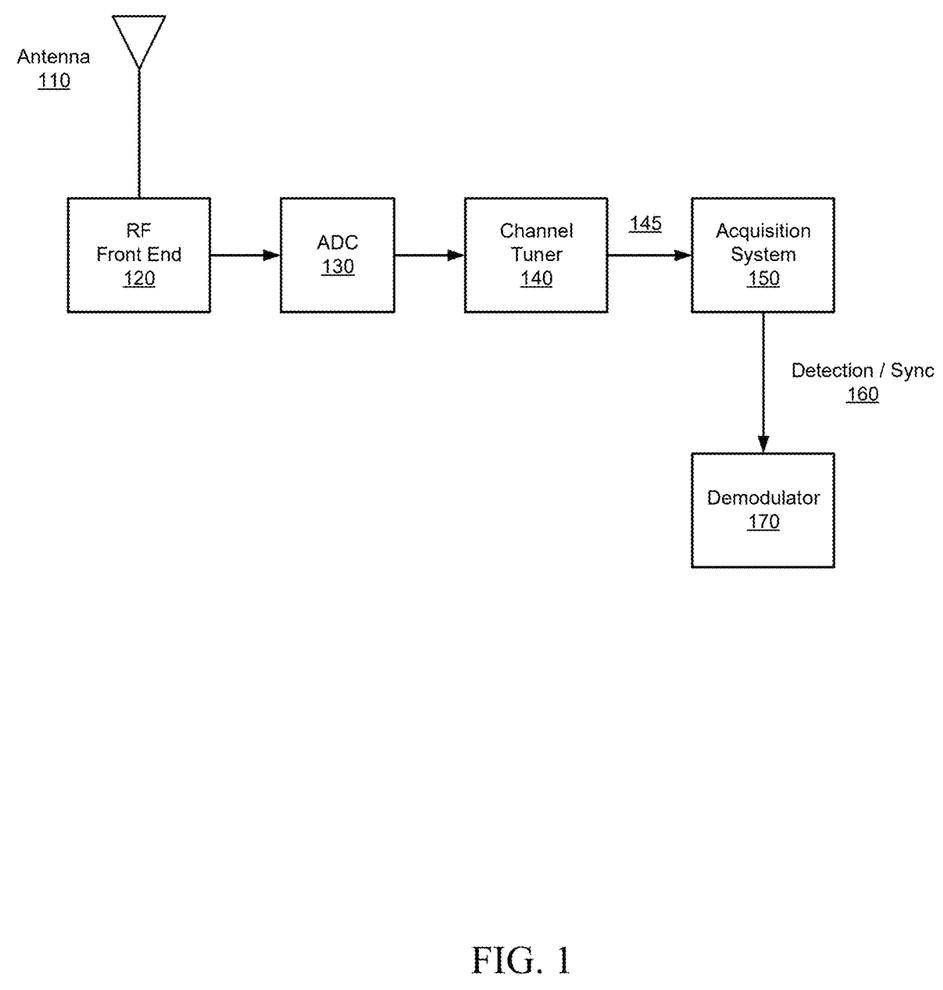
FIG. 1 is a block diagram of a spread spectrum receiver, configured in accordance with certain embodiments of the present disclosure.

FIG. 1 is a block diagram of a spread spectrum receiver 100, configured in accordance with certain embodiments of the present disclosure. The spread spectrum receiver 100 is shown to include an antenna 110, a radio frequency (RF) front end 120, and analog to digital converter (ADC) 130, a channel tuner 140, an acquisition system 150, and a demodulator 170.

The antenna 110 is configured to receive RF signals of interest, including spread spectrum signals, from any number of transmitting platforms. Due to relative motion between the transmitting platforms and the platform hosting the receiver 100, the received signals may be subject to Doppler shift.

The RF front end 120, in some embodiments, is configured to convert the received RF signal down to an intermediate frequency (IF) signal or a baseband signal and perform any suitable filtering and amplification. The ADC 130 is configured to convert the resulting analog IF or baseband signal to a complex digital signal comprising in-phase and quadrature data samples (IQ data).

The channel tuner 140 is configured to tune to a frequency band of interest within the digital signal provided by the ADC 130. In some embodiments, this may include further frequency conversions and filtering. In some embodiments, the channel tuner may also perform automatic gain control (AGC) on the digital signal to maintain a relatively constant average power level over time which simplifies subsequent peak detection thresholding operations performed by the acquisition system 150. The output of the channel tuner is a complex valued digital time domain signal 145.

Operation of the acquisition system 150 will be described in greater detail below, but at a high level, the acquisition system 150 is configured to detect a code sequence in the digital time domain signal 145. The digital time domain signal 145 may comprise a Doppler shifted spread spectrum signal and the code sequence may be a preamble for that spread spectrum signal. The acquisition system 150 is configured to generate a detection/synchronization message 160, based on the detected code sequence, for use by the demodulator 170.

The demodulator 170 is configured to use the detection/synchronization information 160 provided by the acquisition system 150 to synchronize to the spread spectrum signal enabling demodulation and decoding of that signal. The demodulator 170 may employ any suitable demodulation techniques to demodulate and decode the signal. The demodulated signal may then be used for any suitable purpose (e.g., for navigation based on a GPS signal or for communication, etc.).

Figure 2:
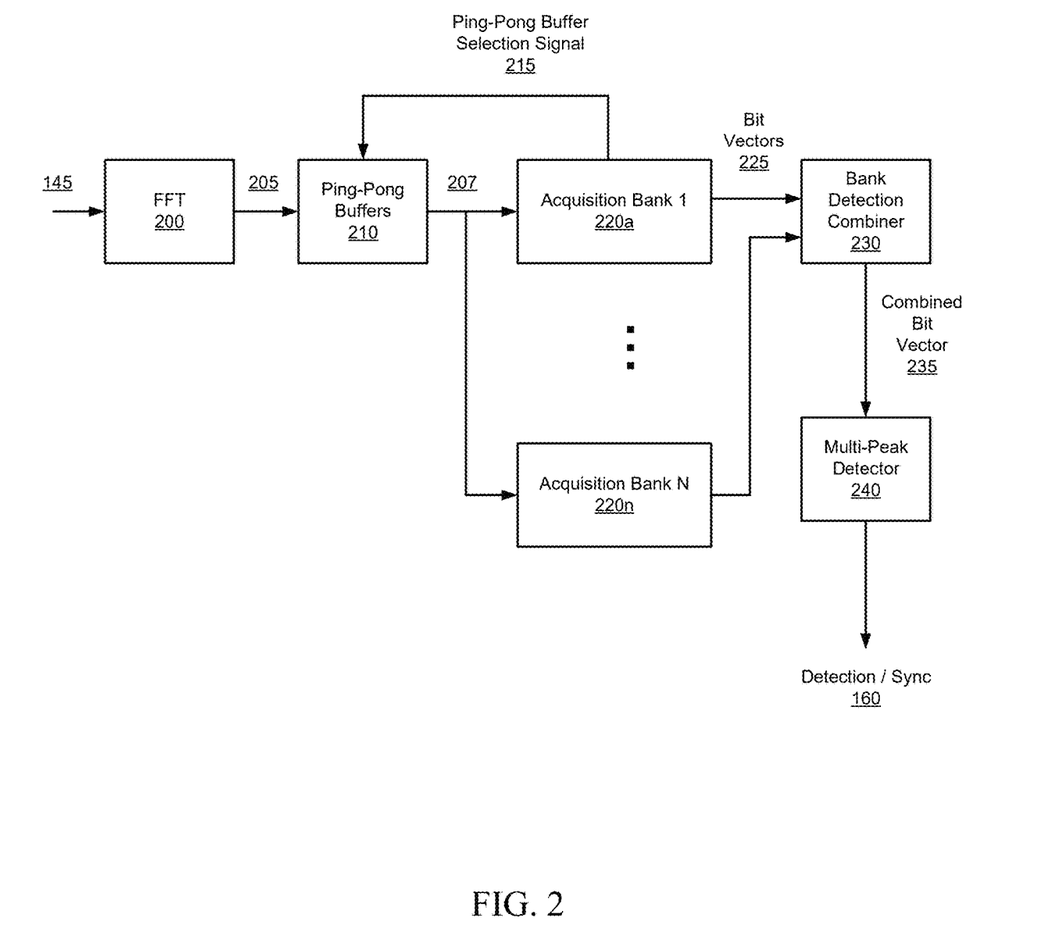
FIG. 2 is a block diagram of the acquisition system of the spread spectrum receiver of FIG. 1, configured in accordance with certain embodiments of the present disclosure.

FIG. 2 is a block diagram of the acquisition system 150 of the spread spectrum receiver 100 of FIG. 1, configured in accordance with certain embodiments of the present disclosure. The acquisition system 150 is shown to include a fast Fourier transform (FFT) circuit 200, ping-pong buffers 210, a number of acquisition banks 220, a bank detection combiner 230, and a multi-peak detector 240.

The FFT circuit 200 is configured to convert segments of the digital time domain signal 145 to the frequency domain, using an N point FFT, to create frequency domain signal segments 205, for storage into one of the ping-pong buffers 210. The frequency domain segments 205 are stored into the ping-pong buffers 210 on an alternating basis. For example, the first segment is stored in the first ping-pong buffer and the second segment is stored in the second ping-pong buffer. The process ping-pongs back and forth so that the third segment is stored back in the first ping-pong buffer and the fourth segment is stored in the second ping-pong buffer, etc. The timing of the alternation between ping-pong buffers 210 is controlled by a buffer selection signal 215 which is based on completion of processing of the current buffer, as will be described below. In some embodiments, the buffer selection signal 215 may be provided by any one of the acquisition processing banks 220. In this example, the buffer selection signal 215 is provided by the first acquisition processing bank 220a.

The frequency domain signal segments 205 comprise $N_{\mathit{fft}}$ bins at a frequency spacing of $$\Delta f = F_s / N_{\mathit{fft}}$$

where $F_s$ is the sampling rate, which is typically chosen to be twice the chip rate of the spread spectrum signal. In some embodiments, the FFT is performed on a concatenation of $N_{\mathit{fft}}/2$ new samples with $N_{\mathit{fft}}/2$ previous samples, a technique referred to as "overlap and save."

Operation of the acquisition banks 220 will be described in greater detail below, but at a high level, the acquisition banks 220 are configured to correlate the frequency domain segments 205, which are read from the ping-pong buffers 210 as 207, with the code sequence to generate detection peaks. Each of the acquisition banks 220 is configured to perform the correlations over a different range of Doppler frequency offsets (referred to as Doppler bins) and to generate a bit vector 225 representing the locations or phases of the correlation detection peaks for each of the frequency offsets or Doppler bins handled by that acquisition bank. In some embodiments, the first acquisition processing bank 220a is configured to perform the correlations for each of a first set of frequency offsets in a serial fashion (e.g., time multiplexed), the second acquisition processing bank is configured to perform the correlations for each of a second set of frequency offsets in a serial fashion, and so on for each additional bank to acquisition bank N 220n. In some embodiments, each of the acquisition processing banks 220 are configured to operate in parallel with each other. Efficiency is obtained, in part, by using one FFT processor 200 to provide data to be shared, through the ping-pong buffer 210, by all of the acquisition banks 220.

The bank detection combiner 230 is configured to perform a logical OR of the bit vectors 225 generated by each acquisition bank 220 to generate a combined bit vector 235 for the current segment 207 (e.g., from the current ping-pong buffer being processed), as will be described in greater detail below.

Operation of the multi-peak detector 240 will be described in greater detail below, but at a high level, the multi-peak detector 240 is configured to accumulate combined bit vectors 235 over time (e.g., sequential segments 205) and identify two consecutive correlation detection peaks in the accumulated combined bit vectors that are separated by a number of bit locations that correspond to an expected signal repetition rate (e.g., the repetition rate of the preamble) modified by a selected range of Doppler offsets. The selected range of Doppler offsets includes Doppler induced sampling frequency offsets. The multi-peak detector 240 is further configured to generate a signal acquisition detection 160 in response to the identification.

Figure 3:
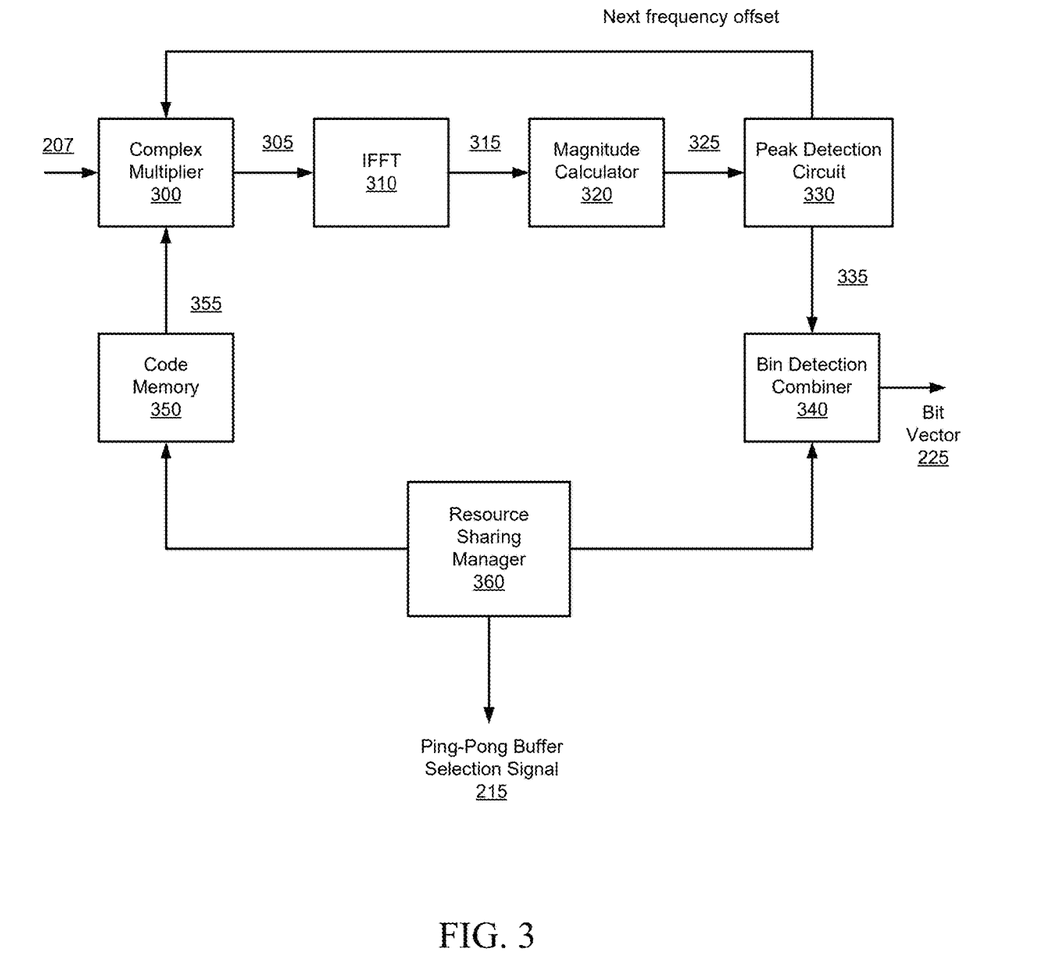
FIG. 3 is a block diagram of the acquisition banks of the acquisition system of FIG. 2, configured in accordance with certain embodiments of the present disclosure.

FIG. 3 is a block diagram of the acquisition banks 220 of the acquisition system 150 of FIG. 2, configured in accordance with certain embodiments of the present disclosure. An acquisition bank is shown to include a complex multiplier 300, an inverse FFT (IFFT) circuit 310, a magnitude calculator 320, a peak detection circuit 330, a bin detection combiner 340, a code memory 350, and a resource sharing manager 360.

The code memory 350 is configured to store a frequency domain version of the code sequence (e.g., spread spectrum preamble) 355 that is the object of the acquisition search. In some embodiments, the code memory stores the FFT of $N_{fft}/2$ samples of the code sequence padded with $N_{fft}/2$ zeros.

The complex multiplier 300 is configured to obtain the current frequency domain segment of the signal to be correlated 207 from either the first or the second ping-pong buffer 210, based on the buffer selection signal 215. The complex multiplier 300 multiplies that signal with the frequency domain version of the code sequence 355 which is obtained from the code memory 350 at an offset index. The offset index corresponds to a first Doppler frequency offset, from the range of Doppler frequency offsets which have been tasked to that acquisition bank 220. The multiplication generates a frequency domain correlation signal 305 for that frequency offset.

The inverse FFT circuit 310 is configured to convert the frequency domain correlation signal 305 to a complex value time domain correlation signal 315. As part of the overlap and save technique, previously mentioned, the last $N_{fft}/2$ samples of the IFFT output 315 are retained and the first $N_{fft}/2$ samples are discarded.

The magnitude calculator 320 is configured to calculate magnitudes of the complex value time domain correlation signal 315. In some embodiments, the magnitudes may be calculated using an efficient approximation that avoids computationally intensive multiplications. For example, the magnitude of each complex valued sample of 315 may be approximated as the sum of the larger of the real or imaginary portion of the sample plus half of the smaller of the real or imaginary portion of the sample.

The peak detection circuit 330 is configured to locate a maximum of the calculated magnitudes (in the FFT/IFFT windows size of $N_{fft}/2$) and identify the maximum as a correlation detection peak 335 if the maximum exceeds an application dependent threshold value. The threshold value may be based, for example, on a desired probability of false alarm. For example, the threshold may be raised to reduce the probability of false alarm.

Since the acquisition bank is configured to run at a faster rate than the input signal sampling rate $F_s$ the process can repeat for the next Doppler frequency offset, from the range of Doppler frequency offsets for that acquisition bank, while operating on the same data in the ping-pong buffer. For example, the complex multiplier 300 re-reads the signal to be correlated 207 from the same ping-pong buffer 210 (e.g., the current segment), and then multiplies that signal with the sequence 355 obtained from the code memory 350 at the next offset index corresponding to the next Doppler frequency offset. Any additional correlation peaks 335 for this frequency offset are detected as described above. For example, if the acquisition bank is running at a processing rate of $10F_s$, the process may repeat up to 5 times (e.g., bank processing rate/$2F_s$) for operation on the same data 207 at 5 frequency offsets. After all the frequency offsets have been processed, the detected correlation peaks 335 are provided to the bin detection combiner 340.

The bin detection combiner 340 is configured to generate a bit vector 225 based on the correlation peaks that have been detected (if any) for each of the set of frequency offsets that are assigned to the acquisition bank.

The resource sharing manager 360 is configured to generate the buffer selection signal 215 to direct storage of the input signal 205 into the first ping-pong buffer during processing of the second buffer (by the acquisition processing banks), and to direct storage of the input signal 205 into the second ping-pong buffer during processing of the first buffer. This allows one buffer which stores a current segment 205 to be processed while the other buffer is being filled with new data from the next segment 205.

Any number of additional acquisition banks may be configured to operate in parallel to perform correlations over additional sets of frequency offsets.

The bank detection combiner 230 is configured to perform a logical OR of the bit vectors 225 generated by each acquisition bank 220 to generate a combined bit vector 235, for the current segment 207, for use by the multi-peak detector 240.

An example case can be illustrated with specific parameters as follows:
 spread spectrum signal chip rate=3.84 MHz
 acquisition bank processing rate=300 MHz
 FFT length ($N_{fft}$)=8192
 System employs 7 Acquisition banks The sampling rate $F_s$ for feeding the FFT circuit is set to twice the chip rate which is 2*3.84 MHz=7.68 MHz. The acquisition banks, operating at a 300 MHz rate, are 19.53 times faster than the sampling rate (including a factor of 2 resulting from the overlap and save process) and can therefore perform 19 time-multiplexed passes over the data in the ping-pong buffer to process 19 Doppler bins. Each Doppler bin covers a frequency range equal to twice the chip rate/$N_{fft}$, which in this case equals 7.68 MHz/8192=937.5 Hz. Each acquisition bank can thus process 19 Doppler bins that are 937.5 Hz wide for a total coverage of 17.81 kHz. By employing 7 acquisition banks, the system can therefore cover a total of 7*17.81 kHz=124.67 kHz of Doppler frequency range in the search for the preamble.

In some embodiments, parameters may be selected such that Doppler bin spacing is set to $0.5/T$, where T is the correlation period, to provide a maximum frequency domain scalloping loss of 0.92 dB. So, for the example described above using overlap and save, $T=N_{fft}/2/F_s$ so that $0.5/T=F_s/N_{fft}$ which enables the design to quantize and limit the maximum loss due to the received signal lying between two Doppler bins.

As previously described, the frequency domain matched filter (e.g., the correlation operation) is performed for each Doppler bin at a different Doppler frequency offset. The Doppler frequency offsets are achieved by reading the code sequence 355 from the code memory 350 at a different offset index corresponding to the desired Doppler frequency offset. Continuing with the above example, the indices may be defined for each bank as follows:

| Bank | Index into code memory | Doppler Frequency Range |
| --- | --- | --- |
| 0 | −66:−48 | −62.3 kHz:−44.5 kHz |
| 1 | −47:−29 | −44.5 kHz:−26.7 kHz |
| 2 | −28:−10 | −26.7 kHz:−8.9 kHz |
| 3 | −9:9 | −8.9 kHz:8.9 kHz |
| 4 | 10:28 | 8.9 kHz:26.7 kHz |
| 5 | 29:47 | 26.7 kHz:44.5 kHz |
| 6 | 48:66 | 44.5 kHz:62.3 kHz |

Figure 4:
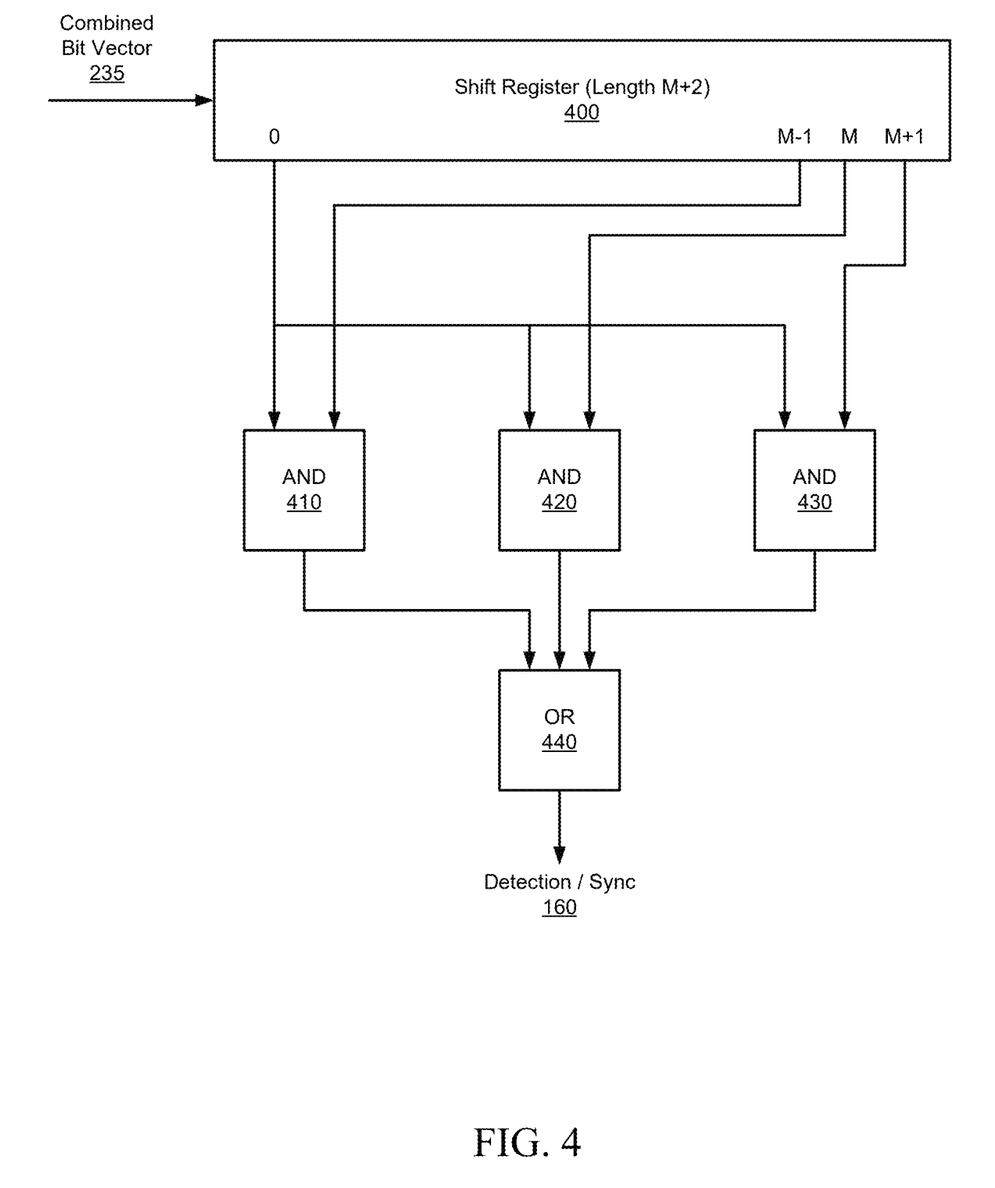
FIG. 4 is a block diagram of the multi-peak detector of the acquisition system of FIG. 2, configured in accordance with certain embodiments of the present disclosure.

FIG. 4 is a block diagram of the multi-peak detector 240 of the acquisition system 150 of FIG. 2, configured in accordance with certain embodiments of the present disclosure. The multi-peak detector 240 is shown to include a shift register 400, logical AND circuits 410, 420, 430, and a logical OR circuit 440.

The shift register 400 is configured to receive the combined bit vector 235 for each segment 207 that has been processed. The combined bit vector 235 for the most recently processed segment may be shifted into the register one bit at a time. The next bit vector 235 resulting from the subsequently processed segment may then be shifted in behind the previous bit vector 235. In some embodiments, the shift register may be of length M+K, where M is the expected number of samples between repetitions of the preamble code sequence and K is based on the number of samples corresponding to a worst case Doppler sampling frequency offset. In the example illustrated in FIG. 4, K=2 so the shift register is of length M+2 to cover a range of bits that are indexed between 0 and M+1.

The logical AND circuits 410-430 are configured to identify pairs of detection peaks that are separated by a selected number of bits in the shift register, as each new bit is shifted in. The selected number of bits of separation represents the expected number of samples between repetitions of the preamble code, plus or minus the anticipated worst case Doppler sampling frequency offset. In this example, where K=2, logical AND circuit 410 is configured to identify a combination of detection peaks located at bit 0 and bit M−1. Similarly, logical AND circuit 420 is configured to identify detection peaks located at both bit 0 and bit M, and logical AND circuit 430 is configured to identify detection peaks located at both bit 0 and bit M+1. For larger values of K, additional AND circuits would be employed to handle the additional separation possibilities.

The logical OR circuit 440 is configured to generate the detection/synchronization signal 160 when any of the AND circuits 410-430 generate an identification (e.g., a logical 1 value). The multi-peak detector 240 allows for the detection of two consecutive peaks at the expected preamble repetition interval even though the distance between those peaks is perturbed by the Doppler sampling frequency offset.

In some embodiments, the multi-peak detector 240 may be implemented by a processor configured to perform a multi-peak detection process. For example, instead of generating bit vectors and using shift registers and logic gates, the indices of the bins containing the correlation peaks may be saved and then a search can be performed (e.g., by a processor) to find indices that differ by an amount that lies within an expected range of values including the worst case Doppler frequency shift.

Methodology

Figure 5:
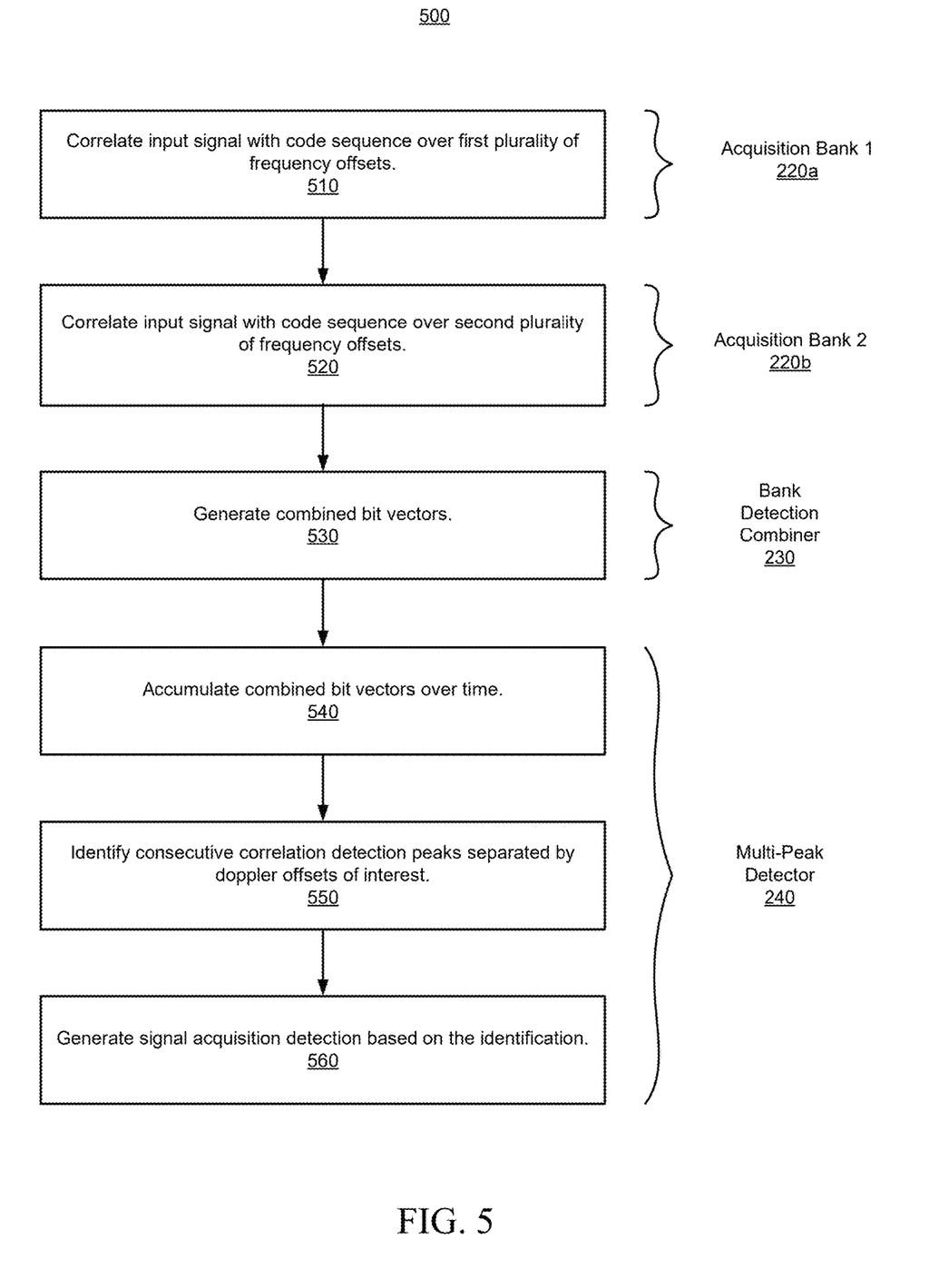
FIG. 5 is a flowchart illustrating a methodology for signal acquisition, in accordance with an embodiment of the present disclosure.

FIG. 5 is a flowchart illustrating a methodology 500 for signal acquisition, in accordance with an embodiment of the present disclosure. As can be seen, example method 500 includes a number of phases and sub-processes, the sequence of which may vary from one embodiment to another. However, when considered in aggregate, these phases and sub-processes form a process for operation of the signal acquisition system 150, in accordance with certain of the embodiments disclosed herein, for example as illustrated in FIGS. 1-4, as described above. However other system architectures can be used in other embodiments, as will be apparent in light of this disclosure. To this end, the correlation of the various functions shown in FIG. 5 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 500 commences, at operation 510, by correlating an input signal with a code sequence at a first plurality of frequency offsets and generating a first bit vector representing locations of peaks of the correlation (e.g., detection peaks) for each of the first plurality of frequency offsets. In some embodiments, the correlation is performed in the frequency domain.

At operation 520, the input signal is correlated with the code sequence at a second plurality of frequency offsets and a second bit vector is generated representing locations of correlation detection peaks for each of the second plurality of frequency offsets. In some embodiments, the correlation is performed in the frequency domain.

At operation 530, the first bit vector and the second bit vector are combined, for example using a logical OR, to generate a combined bit vector.

At operation 540, the combined bit vectors are sequentially accumulated over time to form a longer bit vector.

At operation 550, two consecutive correlation detection peaks are identified in the accumulated combined bit vectors which are separated by a number of bit locations that correspond to a signal repetition rate (e.g., the repetition rate of the preamble) modified by a selected range of Doppler offsets. In some embodiments, the selected range of Doppler offsets includes Doppler induced sampling frequency offsets.

At operation 560, a signal acquisition detection is generated in response to the identification.

In some embodiments, additional operations may be performed, as previously described in connection with the system. For example, a segment of a received time domain signal is converted to a frequency domain signal for storage as the input signal into a first buffer or a second buffer based on a buffer selection signal. The buffer selection signal is generated to direct storage of the input signal into the first buffer during processing of the second buffer (e.g., correlation and peak detection), and to direct storage of the input signal into the second buffer during processing of the first buffer (e.g., correlation and peak detection). In some embodiments, the correlations for each of the first plurality of frequency offsets are performed in parallel with the correlations for each of the second plurality of frequency offsets.

Example System

Figure 6:
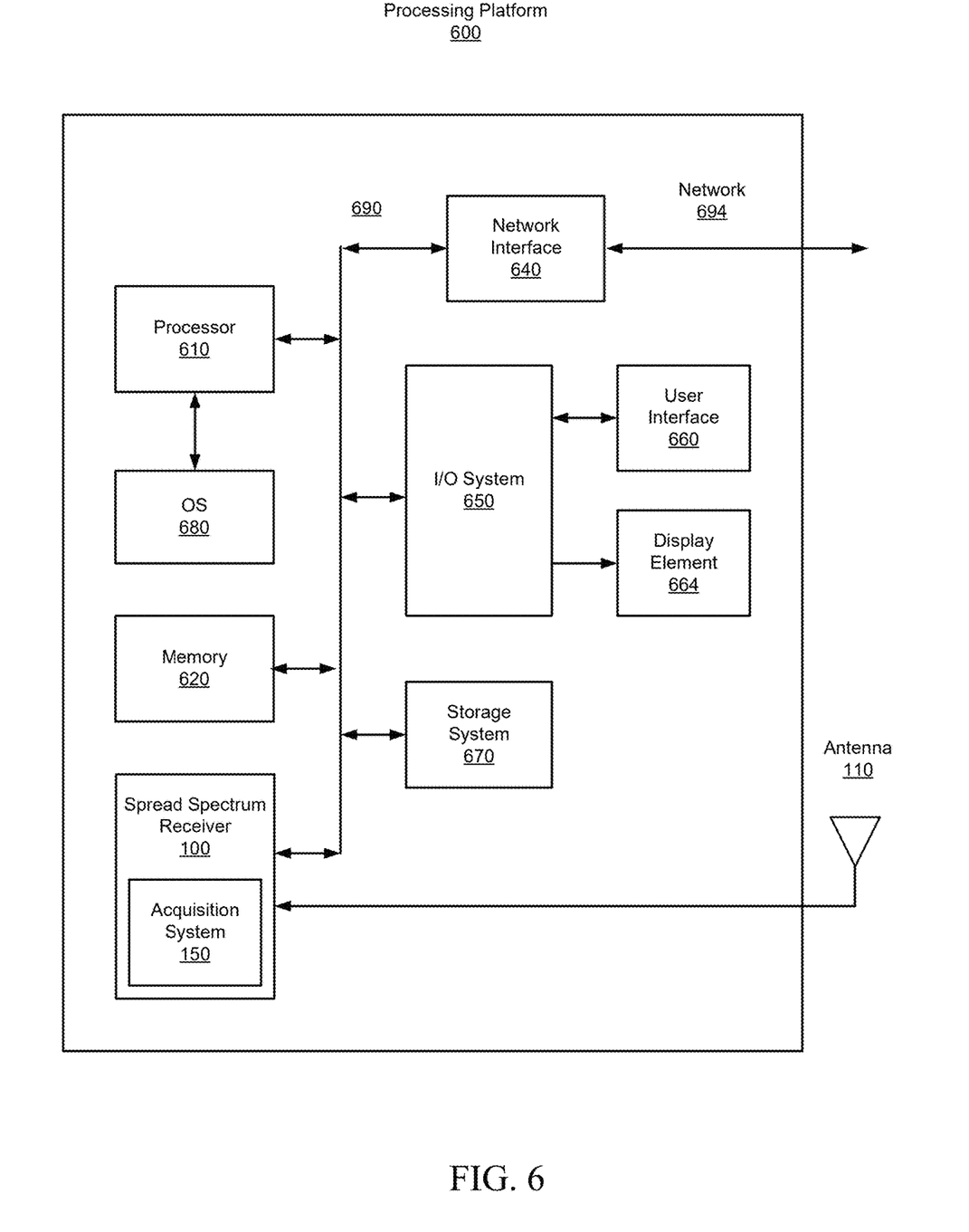
FIG. 6 is a block diagram of a processing platform configured to provide signal acquisition, in accordance with an embodiment of the present disclosure.

FIG. 6 is a block diagram of a processing platform 600 configured to provide signal acquisition, in accordance with an embodiment of the present disclosure. In some embodiments, platform 600, or portions thereof, may be hosted on, or otherwise be incorporated into the electronic systems (e.g., communication receivers, navigation signal receivers, etc.), of an unmanned aerial vehicle (UAV), munition, satellite, an aircraft, ship, ground station, or man-portable system, a personal computer, workstation, laptop computer, tablet, touchpad, portable computer, handheld computer, cellular telephone, smartphone, embedded system, or any other platform where spread spectrum signals are received.

In some embodiments, platform 600 may comprise any combination of a processor 610, memory 620, a network interface 640, an input/output (I/O) system 650, a user interface 660, a display element 664, a storage system 670, spread spectrum receiver 100 including acquisition system 150, and antenna 110. As can be further seen, a bus and/or interconnect 690 is also provided to allow for communication between the various components listed above and/or other components not shown. Platform 600 can be coupled to a network 694 through network interface 640 to allow for communications with other computing devices, platforms, devices to be controlled, or other resources. Other componentry and functionality not reflected in the block diagram of FIG. 6 will be apparent in light of this disclosure, and it will be appreciated that other embodiments are not limited to any particular hardware configuration.

Processor 610 can be any suitable processor, and may include one or more coprocessors or controllers, such as an audio processor, a graphics processing unit, or hardware accelerator, to assist in the execution of mission software and/or any control and processing operations associated with platform 600, including operation of the spread spectrum receiver 100. In some embodiments, the processor 610 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multi-threaded cores in that they may include more than one hardware thread context (or "logical processor") per core. Processor 610 may be implemented as a complex instruction set computer (CISC) or a reduced instruction set computer (RISC) processor. In some embodiments, processor 610 may be configured as an x86 instruction set compatible processor.

Memory 620 can be implemented using any suitable type of digital storage including, for example, flash memory and/or random access memory (RAM). In some embodiments, the memory 620 may include various layers of memory hierarchy and/or memory caches as are known to those of skill in the art. Memory 620 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 610 may be configured to execute an Operating System (OS) 680 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 600, and therefore may also be implemented using any suitable existing or subsequently-developed platform.

Network interface circuit 640 can be any appropriate network chip or chipset which allows for wired and/or wireless connection between other components of platform 600 and/or network 694, thereby enabling platform 600 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of platform 600. I/O devices may include, but not be limited to, user interface 660 and display element 664. User interface 660 may include devices (not shown) such as a touchpad, cockpit display unit, keyboard, and mouse, etc., for example, to allow the user to control the system. Display element 664 may be configured to display information to a user. I/O system 650 may include a graphics subsystem configured to perform processing of images for rendering on the display element 664. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 610 or any chipset of platform 600.

It will be appreciated that in some embodiments, the various components of platform 600 may be combined or integrated in a system-on-a-chip (SoC) architecture. In some embodiments, the components may be hardware components, firmware components, software components or any suitable combination of hardware, firmware, or software.

Acquisition system 150 is configured to acquire a spread spectrum signal, by detecting and synchronizing to a preamble code sequence, over a relatively large range of Doppler offsets, as described previously. Spread spectrum receiver 100, including acquisition system 150, may include any or all of the circuits/components illustrated in FIGS. 1-4, as described above. These components can be implemented or otherwise used in conjunction with a variety of suitable software and/or hardware that is coupled to or that otherwise forms a part of platform 600. These components can additionally or alternatively be implemented or otherwise used in conjunction with user I/O devices that are capable of providing information to, and receiving information and commands from, a user.

In various embodiments, platform 600 may be implemented as a wireless system, a wired system, or a combination of both. When implemented as a wireless system, platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hardcoded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a signal acquisition system comprising: a first acquisition processing bank configured to correlate an input signal with a code sequence at a first plurality of frequency offsets and generate a first bit vector representing locations of correlation detection peaks for each of the first plurality of frequency offsets; a second acquisition processing bank configured to correlate the input signal with the code sequence at a second plurality of frequency offsets and generate a second bit vector representing locations of correlation detection peaks for each of the second plurality of frequency offsets; a bank detection combiner coupled to the first acquisition processing bank and the second acquisition processing bank, the bank detection combiner configured to perform a logical OR of the first bit vector and the second bit vector to generate a combined bit vector; and a multi-peak detector coupled to the bank detection combiner and configured to accumulate the combined bit vectors over time, identify two consecutive correlation detection peaks in the accumulated combined bit vectors that are separated by a number of bit locations that correspond to a signal repetition rate modified by a selected range of Doppler offsets, and generate a signal acquisition detection in response to the identification.

Example 2 includes the system of Example 1, wherein the multi-peak detector comprises: a shift register configured to accumulate the combined bit vectors over time by receiving bits of the combined bit vectors for shifting into the shift register; a first logical AND circuit configured to detect two consecutive correlation detection peaks in the shift register that are separated by a first number of bit locations that correspond to the signal repetition rate modified by a first range of Doppler offsets; a second logical AND circuit configured to detect two consecutive correlation detection peaks in the shift register that are separated by a second number of bit locations that correspond to the signal repetition rate modified by a second range of Doppler offsets; and a logical OR circuit configured to generate the signal acquisition detection in response the first logical AND circuit detection or the second logical AND circuit detection.

Example 3 includes the system of any of Examples 1 or 2, wherein the bank detection combiner comprises a plurality of logical OR circuits wherein each of the logical OR circuits is configured to perform a logical OR of one of the bits of the first bit vector with one of the bits of the second bit vector to generate a corresponding bit of the combined bit vector.

Example 4 includes the system of any of Examples 1-3, wherein the first acquisition processing bank is configured to perform the correlations for each of the first plurality of frequency offsets serially, the second acquisition processing bank is configured to perform the correlations for each of the second plurality of frequency offsets serially, and the first acquisition processing bank is configured to operate in parallel with the second acquisition processing bank.

Example 5 includes the system of any of Examples 1-4, comprising a fast Fourier transform (FFT) circuit configured to convert a segment of a received time domain signal to a frequency domain signal for storage as the input signal into a first buffer or a second buffer based on a buffer selection signal provided by the first acquisition processing bank.

Example 6 includes the system of Example 5, wherein the first acquisition processing bank comprises: a code memory configured to store a frequency domain version of the code sequence; a complex multiplier configured to obtain the input signal to be correlated from the first buffer or the second buffer, based on the buffer selection signal, and multiply the input signal with the frequency domain version of the code sequence obtained at an index into the code memory, the index corresponding to a frequency offset, to generate a frequency domain correlation signal for each of the first plurality of frequency offsets; an inverse FFT circuit configured to convert the frequency domain correlation signal to a complex value time domain correlation signal; a magnitude calculator configured to calculate magnitudes of the complex value time domain correlation signal; a peak detection circuit configured to locate a maximum of the calculated magnitudes and identify the maximum as a correlation detection peak if the maximum exceeds a threshold value; and a bin detection combiner configured to generate the first bit vector based on the correlation detection peaks for each of the first plurality of frequency offsets.

Example 7 includes the system of Example 6, wherein the first acquisition processing bank comprises a resource sharing manager configured to generate the buffer selection signal to direct storage of the input signal into the first buffer during processing by the first acquisition processing bank of the second buffer, and to direct storage of the input signal into the second buffer during processing by the first acquisition processing bank of the first buffer.

Example 8 includes the system of Example 5, wherein the second acquisition processing bank comprises: a code memory configured to store a frequency domain version of the code sequence; a complex multiplier configured to obtain the input signal to be correlated from the first buffer or the second buffer, based on the buffer selection signal, and multiply the input signal with the frequency domain version of the code sequence obtained at an index into the code memory, the index corresponding to a frequency offset, to generate a frequency domain correlation signal for each of the second plurality of frequency offsets; an inverse FFT circuit configured to convert the frequency domain correlation signal to a complex value time domain correlation signal; a magnitude calculator configured to calculate magnitudes of the complex value time domain correlation signal; a peak detection circuit configured to locate a maximum of the calculated magnitudes and identify the maximum as a correlation detection peak if the maximum exceeds a threshold value; and a bin detection combiner configured to generate the second bit vector based on the correlation detection peaks for each of the second plurality of frequency offsets.

Example 9 includes the system of any of Examples 1-8, wherein the selected range of Doppler offsets includes Doppler induced sampling frequency offsets.

Example 10 is a computer program product including one or more non-transitory machine-readable mediums encoded with instructions that when executed by one or more processors cause a process to be carried out for signal acquisition, the process comprising: correlating an input signal with a code sequence at a first plurality of frequency offsets and generating a first bit vector representing locations of correlation detection peaks for each of the first plurality of frequency offsets; correlating the input signal with the code sequence at a second plurality of frequency offsets and generating a second bit vector representing locations of correlation detection peaks for each of the second plurality of frequency offsets; performing a logical OR of the first bit vector and the second bit vector to generate a combined bit vector; and accumulating the combined bit vectors over time; identifying two consecutive correlation detection peaks in the accumulated combined bit vectors that are separated by a number of bit locations that correspond to a signal repetition rate modified by a selected range of Doppler offsets; and generating a signal acquisition detection in response to the identification.

Example 11 includes the computer program product of Example 10, wherein the correlations for each of the first plurality of frequency offsets are performed in parallel with the correlations for each of the second plurality of frequency offsets.

Example 12 includes the computer program product of Examples 10 or 11, wherein the process further comprises converting a segment of a received time domain signal to a frequency domain signal for storage as the input signal into a first buffer or a second buffer based on a buffer selection signal.

Example 13 includes the computer program product of Example 12, wherein the process further comprises: obtaining the input signal to be correlated from the first buffer or the second buffer, based on the buffer selection signal; multiplying the input signal with a frequency domain version of the code sequence stored in a code memory and obtained at an index into the code memory, the index corresponding to a frequency offset, to generate a frequency domain correlation signal for each of the first plurality of frequency offsets; converting the frequency domain correlation signal to a complex value time domain correlation signal; calculating magnitudes of the complex value time domain correlation signal; locating a maximum of the calculated magnitudes; identifying the maximum as a correlation detection peak if the maximum exceeds a threshold value; and generating the first bit vector based on the correlation detection peaks for each of the first plurality of frequency offsets.

Example 14 includes the computer program product of Example 13, wherein the process further comprises generating the buffer selection signal to direct storage of the input signal into the first buffer during processing of the second buffer, and to direct storage of the input signal into the second buffer during processing of the first buffer.

Example 15 includes the computer program product of any of Examples 10-14, wherein the selected range of Doppler offsets includes Doppler induced sampling frequency offsets.

Example 16 is a method for signal acquisition comprising: correlating an input signal with a code sequence at a first plurality of frequency offsets and generating a first bit vector representing locations of correlation detection peaks for each of the first plurality of frequency offsets; correlating the input signal with the code sequence at a second plurality of frequency offsets and generating a second bit vector representing locations of correlation detection peaks for each of the second plurality of frequency offsets; performing a logical OR of the first bit vector and the second bit vector to generate a combined bit vector; and accumulating the combined bit vectors over time; identifying two consecutive correlation detection peaks in the accumulated combined bit vectors that are separated by a number of bit locations that correspond to a signal repetition rate modified by a selected range of Doppler offsets, the selected range of Doppler offsets including Doppler induced sampling frequency offsets; and generating a signal acquisition detection in response to the identification.

Example 17 includes the method of Example 16, wherein the correlations for each of the first plurality of frequency offsets are performed in parallel with the correlations for each of the second plurality of frequency offsets.

Example 18 includes the method of Examples 16 or 17, further comprising converting a segment of a received time domain signal to a frequency domain signal for storage as the input signal into a first buffer or a second buffer based on a buffer selection signal.

Example 19 includes the method of Example 18, further comprising: obtaining the input signal to be correlated from the first buffer or the second buffer, based on the buffer selection signal; multiplying the input signal with a frequency domain version of the code sequence stored in a code memory and obtained at an index into the code memory, the index corresponding to a frequency offset, to generate a frequency domain correlation signal for each of the first plurality of frequency offsets; converting the frequency domain correlation signal to a complex value time domain correlation signal; calculating magnitudes of the complex value time domain correlation signal; locating a maximum of the calculated magnitudes; identifying the maximum as a correlation detection peak if the maximum exceeds a threshold value; and generating the first bit vector based on the correlation detection peaks for each of the first plurality of frequency offsets.

Example 20 includes the method of Example 19, further comprising generating the buffer selection signal to direct storage of the input signal into the first buffer during processing of the second buffer, and to direct storage of the input signal into the second buffer during processing of the first buffer.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A signal acquisition system comprising:
   a first acquisition processing bank configured to correlate an input signal with a code sequence at a first plurality of frequency offsets and generate a first bit vector representing locations of correlation detection peaks for each of the first plurality of frequency offsets;
   a second acquisition processing bank configured to correlate the input signal with the code sequence at a second plurality of frequency offsets and generate a second bit vector representing locations of correlation detection peaks for each of the second plurality of frequency offsets;
   a bank detection combiner coupled to the first acquisition processing bank and the second acquisition processing bank, the bank detection combiner configured to perform a logical OR of the first bit vector and the second bit vector to generate a combined bit vector; and
   a multi-peak detector coupled to the bank detection combiner and configured to accumulate the combined bit vectors over time, identify two consecutive correlation detection peaks in the accumulated combined bit vectors that are separated by a number of bit locations that correspond to a signal repetition rate modified by a selected range of Doppler offsets, and generate a signal acquisition detection in response to the identification.

2. The system of claim 1, wherein the multi-peak detector comprises:
   a shift register configured to accumulate the combined bit vectors over time by receiving bits of the combined bit vectors for shifting into the shift register;
   a first logical AND circuit configured to detect two consecutive correlation detection peaks in the shift register that are separated by a first number of bit locations that correspond to the signal repetition rate modified by a first range of Doppler offsets;
   a second logical AND circuit configured to detect two consecutive correlation detection peaks in the shift register that are separated by a second number of bit locations that correspond to the signal repetition rate modified by a second range of Doppler offsets; and
   a logical OR circuit configured to generate the signal acquisition detection in response the first logical AND circuit detection or the second logical AND circuit detection.

3. The system of claim 1, wherein the bank detection combiner comprises a plurality of logical OR circuits wherein each of the logical OR circuits is configured to perform a logical OR of one of the bits of the first bit vector with one of the bits of the second bit vector to generate a corresponding bit of the combined bit vector.

4. The system of claim 1, wherein the first acquisition processing bank is configured to perform the correlations for each of the first plurality of frequency offsets serially, the second acquisition processing bank is configured to perform the correlations for each of the second plurality of frequency offsets serially, and the first acquisition processing bank is configured to operate in parallel with the second acquisition processing bank.

5. The system of claim 1, comprising a fast Fourier transform (FFT) circuit configured to convert a segment of a received time domain signal to a frequency domain signal for storage as the input signal into a first buffer or a second buffer based on a buffer selection signal provided by the first acquisition processing bank.

6. The system of claim 5, wherein the first acquisition processing bank comprises:
   a code memory configured to store a frequency domain version of the code sequence;
   a complex multiplier configured to obtain the input signal to be correlated from the first buffer or the second buffer, based on the buffer selection signal, and multiply the input signal with the frequency domain version of the code sequence obtained at an index into the code memory, the index corresponding to a frequency offset, to generate a frequency domain correlation signal for each of the first plurality of frequency offsets;
   an inverse FFT circuit configured to convert the frequency domain correlation signal to a complex value time domain correlation signal;
   a magnitude calculator configured to calculate magnitudes of the complex value time domain correlation signal;
   a peak detection circuit configured to locate a maximum of the calculated magnitudes and identify the maximum as a correlation detection peak if the maximum exceeds a threshold value; and
   a bin detection combiner configured to generate the first bit vector based on the correlation detection peaks for each of the first plurality of frequency offsets.

7. The system of claim 6, wherein the first acquisition processing bank comprises a resource sharing manager configured to generate the buffer selection signal to direct storage of the input signal into the first buffer during processing by the first acquisition processing bank of the second buffer, and to direct storage of the input signal into the second buffer during processing by the first acquisition processing bank of the first buffer.

8. The system of claim 5, wherein the second acquisition processing bank comprises:
   a code memory configured to store a frequency domain version of the code sequence;
   a complex multiplier configured to obtain the input signal to be correlated from the first buffer or the second buffer, based on the buffer selection signal, and multiply the input signal with the frequency domain version of the code sequence obtained at an index into the code memory, the index corresponding to a frequency offset, to generate a frequency domain correlation signal for each of the second plurality of frequency offsets;

an inverse FFT circuit configured to convert the frequency domain correlation signal to a complex value time domain correlation signal;
a magnitude calculator configured to calculate magnitudes of the complex value time domain correlation signal;
a peak detection circuit configured to locate a maximum of the calculated magnitudes and identify the maximum as a correlation detection peak if the maximum exceeds a threshold value; and
a bin detection combiner configured to generate the second bit vector based on the correlation detection peaks for each of the second plurality of frequency offsets.

9. The system of claim 1, wherein the selected range of Doppler offsets includes Doppler induced sampling frequency offsets.

10. A computer program product including one or more non-transitory machine-readable mediums encoded with instructions that when executed by one or more processors cause a process to be carried out for signal acquisition, the process comprising:
correlating an input signal with a code sequence at a first plurality of frequency offsets and generating a first bit vector representing locations of correlation detection peaks for each of the first plurality of frequency offsets;
correlating the input signal with the code sequence at a second plurality of frequency offsets and generating a second bit vector representing locations of correlation detection peaks for each of the second plurality of frequency offsets;
performing a logical OR of the first bit vector and the second bit vector to generate a combined bit vector; and
accumulating the combined bit vectors over time;
identifying two consecutive correlation detection peaks in the accumulated combined bit vectors that are separated by a number of bit locations that correspond to a signal repetition rate modified by a selected range of Doppler offsets; and
generating a signal acquisition detection in response to the identification.

11. The computer program product of claim 10, wherein the correlations for each of the first plurality of frequency offsets are performed in parallel with the correlations for each of the second plurality of frequency offsets.

12. The computer program product of claim 10, wherein the process further comprises converting a segment of a received time domain signal to a frequency domain signal for storage as the input signal into a first buffer or a second buffer based on a buffer selection signal.

13. The computer program product of claim 12, wherein the process further comprises:
obtaining the input signal to be correlated from the first buffer or the second buffer, based on the buffer selection signal;
multiplying the input signal with a frequency domain version of the code sequence stored in a code memory and obtained at an index into the code memory, the index corresponding to a frequency offset, to generate a frequency domain correlation signal for each of the first plurality of frequency offsets;
converting the frequency domain correlation signal to a complex value time domain correlation signal;
calculating magnitudes of the complex value time domain correlation signal;
locating a maximum of the calculated magnitudes;
identifying the maximum as a correlation detection peak if the maximum exceeds a threshold value; and
generating the first bit vector based on the correlation detection peaks for each of the first plurality of frequency offsets.

14. The computer program product of claim 13, wherein the process further comprises generating the buffer selection signal to direct storage of the input signal into the first buffer during processing of the second buffer, and to direct storage of the input signal into the second buffer during processing of the first buffer.

15. The computer program product of claim 10, wherein the selected range of Doppler offsets includes Doppler induced sampling frequency offsets.

16. A method for signal acquisition comprising:
correlating an input signal with a code sequence at a first plurality of frequency offsets and generating a first bit vector representing locations of correlation detection peaks for each of the first plurality of frequency offsets;
correlating the input signal with the code sequence at a second plurality of frequency offsets and generating a second bit vector representing locations of correlation detection peaks for each of the second plurality of frequency offsets;
performing a logical OR of the first bit vector and the second bit vector to generate a combined bit vector; and
accumulating the combined bit vectors over time;
identifying two consecutive correlation detection peaks in the accumulated combined bit vectors that are separated by a number of bit locations that correspond to a signal repetition rate modified by a selected range of Doppler offsets, the selected range of Doppler offsets including Doppler induced sampling frequency offsets; and
generating a signal acquisition detection in response to the identification.

17. The method of claim 16, wherein the correlations for each of the first plurality of frequency offsets are performed in parallel with the correlations for each of the second plurality of frequency offsets.

18. The method of claim 16, further comprising converting a segment of a received time domain signal to a frequency domain signal for storage as the input signal into a first buffer or a second buffer based on a buffer selection signal.

19. The method of claim 18, further comprising:
obtaining the input signal to be correlated from the first buffer or the second buffer, based on the buffer selection signal;
multiplying the input signal with a frequency domain version of the code sequence stored in a code memory and obtained at an index into the code memory, the index corresponding to a frequency offset, to generate a frequency domain correlation signal for each of the first plurality of frequency offsets;
converting the frequency domain correlation signal to a complex value time domain correlation signal;
calculating magnitudes of the complex value time domain correlation signal;
locating a maximum of the calculated magnitudes;
identifying the maximum as a correlation detection peak if the maximum exceeds a threshold value; and
generating the first bit vector based on the correlation detection peaks for each of the first plurality of frequency offsets.

20. The method of claim 19, further comprising generating the buffer selection signal to direct storage of the input signal into the first buffer during processing of the second buffer, and to direct storage of the input signal into the second buffer during processing of the first buffer.

\* \* \* \* \*